United States Patent
Shen et al.

(10) Patent No.: US 9,722,689 B2
(45) Date of Patent: Aug. 1, 2017

(54) RADIO COMMUNICATION SYSTEM, RADIO MOBILE STATION AND RADIO BASE STATION

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/028,472

(22) PCT Filed: Oct. 8, 2014

(86) PCT No.: PCT/JP2014/076925
§ 371 (c)(1),
(2) Date: Apr. 11, 2016

(87) PCT Pub. No.: WO2015/053307
PCT Pub. Date: Apr. 16, 2015

(65) Prior Publication Data
US 2016/0233947 A1    Aug. 11, 2016

(30) Foreign Application Priority Data
Oct. 9, 2013  (JP) .................................. 2013-212303

(51) Int. Cl.
*H04W 4/02* (2009.01)
*H04B 7/155* (2006.01)
(Continued)

(52) U.S. Cl.
CPC ........ *H04B 7/15507* (2013.01); *H04W 4/046* (2013.01); *H04W 16/28* (2013.01); *H04W 84/005* (2013.01)

(58) Field of Classification Search
CPC .............................. H04W 84/005; H04W 4/02
(Continued)

(56) References Cited

U.S. PATENT DOCUMENTS

| 7,164,911 B2 * | 1/2007 | Watanabe ............. H04W 60/00 455/435.1 |
| 2007/0082672 A1 * | 4/2007 | Fujioka .................... H04B 7/26 455/436 |

(Continued)

FOREIGN PATENT DOCUMENTS

| JP | H09-084126 A | 3/1997 |
| JP | H11-331171 A | 11/1999 |

(Continued)

OTHER PUBLICATIONS

International Search Report issued in PCT/JP2014/076925 mailed on Jan. 13, 2015 (2 pages).

(Continued)

*Primary Examiner* — John J Lee
(74) *Attorney, Agent, or Firm* — Osha Liang LLP

(57) ABSTRACT

To improve system performance for mobile communications (group mobility) in a plurality of terminals existing inside the same moving object, a radio communication system of the present invention is a radio communication system for mobile communications in a plurality of user terminals existing in a moving object, and has a radio base station for forming a cell on a moving path of the moving object, and a radio mobile station installed in the moving object to relay communications between the plurality of user terminals and the radio base station. By this means, by offloading communications according to user terminals inside the moving object by the dedicated system for group mobility, it is possible to reduce the load on the existing radio communi- (Continued)

cation system, and it is possible to improve system performance of the entire radio communication system.

5 Claims, 9 Drawing Sheets

(51) Int. Cl.
 *H04W 4/04* (2009.01)
 *H04W 16/28* (2009.01)
 *H04W 84/00* (2009.01)
(58) Field of Classification Search
 USPC .............. 455/502, 452.1, 11.1, 67.11, 456.1
 See application file for complete search history.

(56) References Cited

U.S. PATENT DOCUMENTS

2010/0297937 A1* 11/2010 Kim .................... H04B 7/1555
 455/11.1
2011/0182230 A1 7/2011 Ohm et al.

FOREIGN PATENT DOCUMENTS

| JP | 2002-344478 A | 11/2002 |
| JP | P2002-345009 A | 11/2002 |
| JP | P2006-157117 A | 6/2006 |
| JP | 2008-072449 A | 3/2008 |
| JP | P2008-099233 A | 4/2008 |
| JP | P2010-081551 A | 4/2010 |
| JP | 2011-135439 A | 7/2011 |
| JP | 2012-502527 A | 1/2012 |

OTHER PUBLICATIONS

Written Opinion of the International Searching Authority issued in PCT/JP2014/076925 mailed on Jan. 13, 2015 (4 pages).
3GPP TS 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).

* cited by examiner

RADIO COMMUNICATION SYSTEM, RADIO MOBILE STATION AND RADIO BASE STATION

TECHNICAL FIELD

The present invention relates to a radio communication system, radio mobile station and radio base station in mobile communications (group mobility) in a plurality of terminals existing in the same moving object.

BACKGROUND ART

In LTE (Long Term Evolution) and a successor system (for example, also referred to as LTE-Advanced, FRA (Future Radio Access), 4G and the like) to LTE, radio communication systems (for example, also referred to as Heterogeneous Network) have been studied in which a small cell (including a picocell, femtocell and the like) having relatively small coverage with a radius of about several meters to several tens of meters is arranged, while overlapping a macrocell having relatively large coverage with a radius of about several hundreds of meters to several kilometers (for example, Non-patent Literature 1).

In such a radio communication system are studied a scenario (for example, also referred to as co-channel) using the same frequency band in both the macrocell and the small call, and another scenario (for example, also referred to as separate frequency) using different frequency bands in the macrocell and the small cell. More specifically, in the latter scenario, it is studied that a relatively low frequency band (for example, 2 GHz) is used in the macrocell, and that a relatively high frequency band (for example, 3.5 GHz, 10 GHz and the like) is used in the small cell.

CITATION LIST

Non-Patent Literature

Non-Patent Literature 1: 3GPP TR 36.814 "E-UTRA Further advancements for E-UTRA physical layer aspects"

SUMMARY OF INVENTION

Technical Problem

In addition, in the conventional radio communication system, in mobile communications (also referred to as group mobility, GM and the like) in a plurality of terminals existing inside the same moving object (for example, train, bus, ship and the like), each of the terminals communicates with a radio base station individually. Therefore, there is the risk that system performance degrades due to loads by control signals, inter-terminal interference and the like. Particularly, in the case where a moving object including a plurality of user terminals passes through a cell boundary, there is the problem that degradation of system performance is remarkable.

The present invention was made in view of such a respect, and it is an object of the invention to provide a radio communication system, radio mobile station and radio base station for enabling system performance to be improved for group mobility.

Solution to Problem

A radio communication system of the present invention is a radio communication system for mobile communications in a plurality of user terminals existing inside a moving object, and is characterized by having a radio base station for forming a cell on a moving path of the moving object, and a radio mobile station installed in the moving object to relay communications between the plurality of user terminals and the radio base station.

Advantageous Effects of Invention

According to the present invention, it is possible to improve system performance for mobile communications (group mobility) in a plurality of terminals existing inside the same moving object.

DESCRIPTION OF EMBODIMENTS

Figure 1:
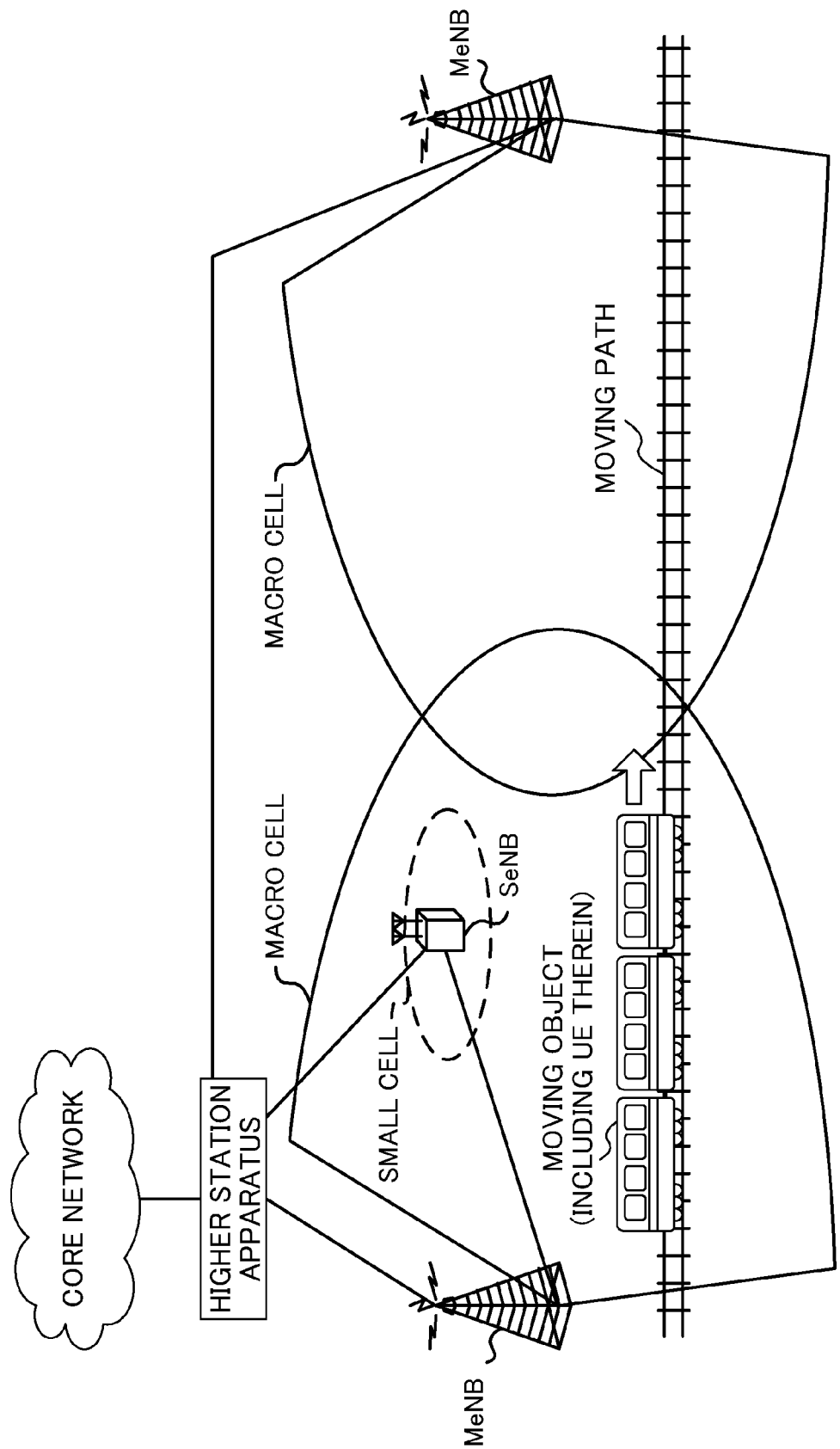
FIG. 1 is one example of a conceptual diagram of a network configuration to which is applied a radio communication system according to this Embodiment.

FIG. 1 is one example of a conceptual diagram of a network configuration to which is applied a radio communication system according to this Embodiment. The network configuration as shown in FIG. 1 includes radio base stations each (hereinafter, referred to as macro base station or MeNB (Macro eNodeB)) for forming a macrocell, a radio base station (hereinafter, referred to as small base station or SeNB (Small eNodeB)) for forming each small cell, and user terminals (UE: User Equipment) for communicating with at least one of the macro base station and small base station. In FIG. 1, a moving object (train) moves along a predetermined moving path (track), and a plurality of user terminals is included inside the moving object. Further, FIG. 1 illustrates the network configuration where the small base station is overlaid on the range (coverage, cell area) covered by the macrocell to form the small cell.

In the network configuration as shown in FIG. 1, it is studied that a carrier F1 (for example, 2 GHz-band) with a relatively low frequency band (hereinafter, referred to as low-frequency band) is used in the macrocell, and that a carrier F2 (for example, 3.5 GHz-band, 10 GHz-band and the like) with a relatively high frequency band (hereinafter, referred to as high-frequency band) is used in the small cell. In addition, the network configuration to which is applied the radio communication system according to this Embodiment is not limited to the configuration as shown in FIG. 1, and for example, is applicable to the case without the small base station.

It is also studied that coverage securing and mobility support is performed in the macrocell using the carrier F1 with the low-frequency band, and that capacity growth and offload is performed (also referred to as Macro-assisted, C/U-plane split and the like) in the small cell using the carrier F2 with the high-frequency band. For example, when a user terminal is capable of connecting to both the macro base station and the small base station, it is possible to split and control so that the macrocell supports a C (Control)-plane for handling control messages, and that the small cell supports a U (User)-plane for handling user data.

Herein, in proportion to a frequency f, path-loss increases. Therefore, in the small cell in which the carrier F2 with the high-frequency band is used, it is studied to compensate for path-loss by applying beam forming with MIMO (Multiple Input Multiple Output), Massive MIMO (also referred to as three-dimensional (3D)/Massive MIMO) and the like.

Herein, the beam forming (BF) is a technique for controlling amplitude and phases of respective transmission/reception signals in a plurality of antenna elements, thereby providing a transmission/reception beam with directivity, and also enabling a shape of the beam to be changed. In this beam forming, generally, as the number of antenna elements increases, it is possible to perform more sophisticated control. In other words, corresponding to the number of antenna elements, it is possible to control the number of beams, the shape of each beam (width of the beam in a horizontal plane, width of the beam in a vertical plane, etc.) and the direction and gain of the beam in detail. For example, by narrowing the width of the beam (i.e. forming a narrow beam), it is possible to obtain high gain (power density).

In a Massive MIMO transmission scheme, a data rate (frequency usage efficiency) is increased by transmitting data using a large number (for example, 100 or more) of antenna elements. Since data is transmitted using a large number of antenna elements, it is possible to improve transmission efficiency associated with multiplexing as compared with the case of using a small number of antenna elements, and it is possible to perform radio communication at higher speed than conventional communication. Further, sophisticated beam forming is made possible by combinations of a large number of antenna elements.

In the network configuration as shown in FIG. 1, a user terminal (UE) is configured to be able to communicate with the macro base station when the terminal is positioned inside the macrocell, and when the terminal is positioned inside the small cell, is configured to be able to communicate with the small base station. Further, when the terminal is positioned inside the small cell, the terminal may be configured to be able to communicate with also the macro base station, in addition to the small base station. Thus, performing communications concurrently using a plurality of radio communication systems with different usage frequencies is also called Link aggregation. In addition, the user terminal in this Embodiment includes a mobile terminal apparatus and fixed terminal apparatus.

In the network configuration as shown in FIG. 1, the macro base station and small base station are connected to a higher station apparatus (also called the central control station or higher node). The higher station apparatus is connected to a core network. For example, the central control station includes an access gateway apparatus, Radio Network Controller (RNC), Mobility Management Entity (MME) and the like. In addition, such a configuration may be made where a part or the whole of functions of the higher station apparatus are provided in the macro base station.

In addition, in the conventional radio communication system, in mobile communications (Group mobility) in a plurality of terminals existing inside a single moving object (for example, train, bus, ship and the like), each of the terminals communicates with a radio base station individually. As a result, there is the risk that system performance degrades due to loads by control signals, inter-terminal interference and the like.

For example, in FIG. 1, when the moving object passes through the macrocell boundary, since each of the user terminals inside the moving object performs handover simultaneously, large amounts of processes arise to control the handover, and system performance degrades.

Further, in the case where the radio base station and user terminal inside the moving object are not able to perform accurate precoding due to fast channel variations associated with movement of the moving object, inter-terminal interference occurs, and communication performance degrades. Furthermore, the user terminal inside the moving object follows the channel varying at high speed, and thereby needs to frequently perform channel estimation using a reference signal transmitted from the radio base station. Therefore, when each of a plurality of user terminals performs channel estimation independently, overhead is large due to transmission of the reference signal and feedback of channel state information (CSI), and system performance decreases.

Thus, an occurrence source of high-density traffic (communication amount) shifts with movement of the moving object including a plurality of user terminals. Therefore, in the radio base station on the periphery of the moving path of the moving object, a high load occurs when the moving object exists inside the cell (particularly, when the moving object enters the cell from the outside), and the load abruptly decreases when the moving object moves out of the cell. Accordingly, there is the risk that the network of the radio base station is unstable.

Therefore, the inventors of the present invention conceived that it is possible to reduce the load on the existing radio communication system by offloading communications according to user terminals inside the moving object by a dedicated system for group mobility, and arrived at the invention. According to this configuration, without adding any modification to the user terminal, it is possible to improve system performance of the entire radio communication system.

Figure 2:
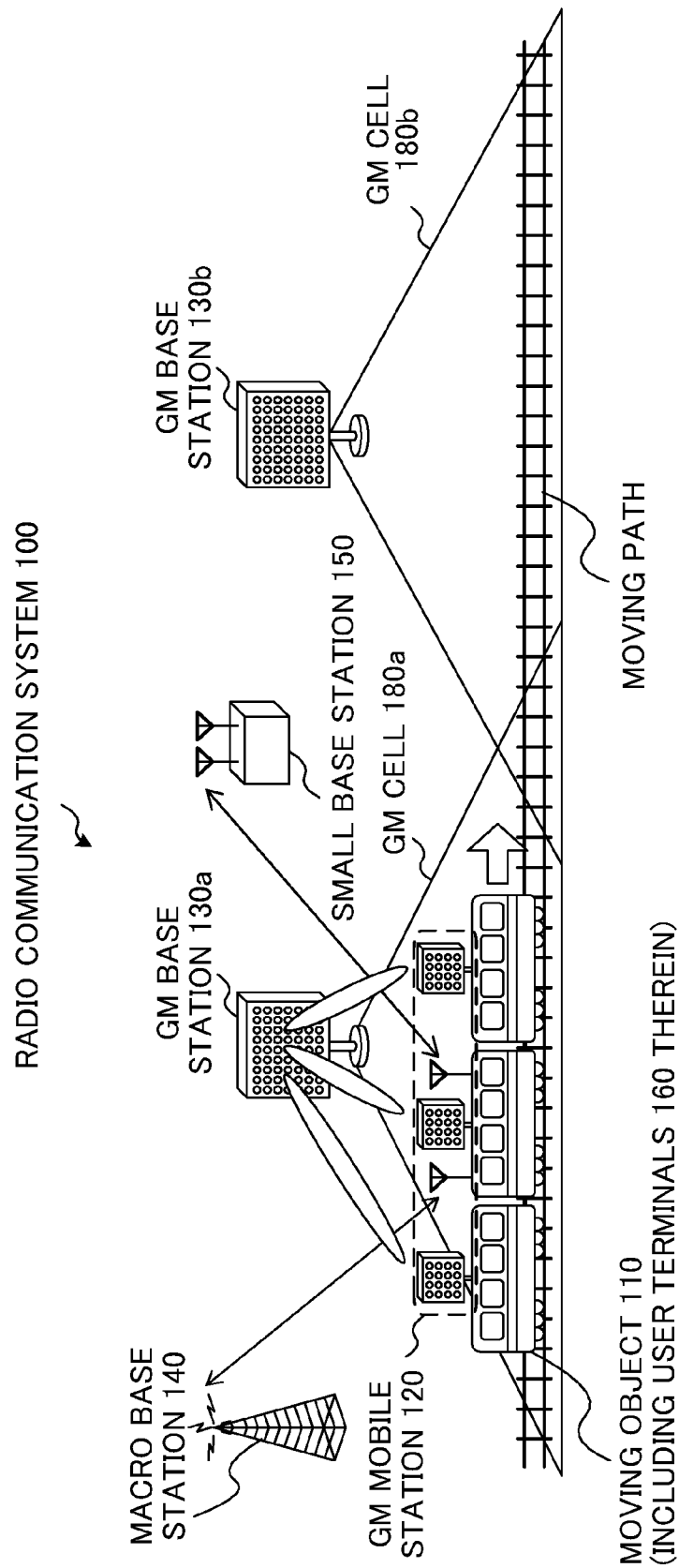
FIG. 2 is a schematic explanatory diagram of the radio communication system according to this Embodiment.

A radio communication system according to this Embodiment will specifically be described below. FIG. 2 is a schematic configuration diagram of the radio communication system (radio communication system 100) according to this Embodiment. For example, the radio communication system 100 as shown in FIG. 2 may be an LTE system, LTE-A system, IMT-Advanced, 4G, FRA (Future Radio Access) and the like. In the following description, this Embodiment will be described using the case where a moving object is a train as an example, but the invention is not limited thereto.

As shown in FIG. 2, the radio communication system 100 is comprised of a moving object 110, GM mobile station 120 mounted on the moving object 110, GM base stations 130 for forming GM cells 180 (180*a*, 180*b*), macro base station 140 for forming a macrocell, small base station 150 for forming a small cell, and a plurality of user terminals 160 included inside the moving object 110. A radio base station (hereinafter, also referred to as dedicated base station)

according to this Embodiment is the GM base station 130, and a radio mobile station (hereinafter, also referred to as dedicated mobile station) according to this Embodiment is the GM mobile station 120. In addition, in FIG. 2, for convenience, the macrocell and small cell are omitted. Further, the configuration of the radio communication system according to this Embodiment is not limited to the configuration as shown in FIG. 2. For example, also the case where one or both of the macro base station 140 and small base station 150 do not exist is applicable.

The moving object 110 is an object that moves along a predetermined path. For example, the moving object 110 is a train, bus, ship and the like.

The GM mobile station 120 is installed in the moving object 110, and relays communications between the user terminals 160 included inside the moving object 110 and the GM base station 130, macro base station 140 and small base station 150.

It is preferable that a transmission/reception antenna of the GM mobile station 120 is of a MIMO configuration having a plurality of antenna elements. By the configuration, using beam forming, it is possible to suitably follow a change in the relative position of each base station in association with movement of the moving object 110, and it is possible to ensure stable communication quality. Further, in a Massive MIMO configuration having a larger number of antenna elements (for example, the number of antenna elements is "1024"), more sophisticated beam forming is made possible, and communication of higher quality is made possible.

The GM base station 130 is a base station for forming a cell (GM cell) that covers a moving path of the moving object, and is installed along the moving path of the moving object 110. The GM base station 130 communicates with the user terminal 160 via the GM mobile station 120 mounted on the moving object 110. Further, it is also possible to use the GM base station 130 as a dedicated base station to the GM mobile station 120. A plurality of GM base stations 130 may be installed along the moving path of the moving object 110. In FIG. 2, installed are two GM base stations including the GM base station 130*a* for forming the GM cell 180*a* and the GM base station 130*b* for forming the GM cell 180*b*.

It is preferable that an installation place of the GM base station 130 is near the moving path of the moving object 110, and is capable of widely covering the moving path. For example, when the moving object 110 is a train, the installation place of the GM base station 130 is suitably beside the track. In addition, the configuration of the radio communication system according to this Embodiment is not limited to the configuration as shown in FIG. 2. For example, in FIG. 2, there is a portion where the GM cells 180*a* and 180*b* overlap each other, and this Embodiment is also applicable to the case where the GM cells do not overlap one another.

It is preferable that a transmission/reception antenna of the GM base station 130 is of a MIMO configuration having a plurality of antenna elements. By the configuration, using beam forming, it is possible to suitably follow movement of the moving object 110, and it is possible to ensure stable communication quality. Further, in a Massive MIMO configuration having a larger number of antenna elements (for example, the number of antenna elements is "1024"), more sophisticated beam forming is made possible, and communication of higher quality is made possible.

The macro base station 140 is a radio base station for forming a cell (macrocell) that has relatively wide coverage, and is capable of communicating with the GM mobile station 120 and user terminal 160. In addition, the macro base station may be called eNodeB (eNB), radio base station, transmission point and the like.

The small base station 150 is a radio base station for forming a cell (small cell) that has local coverage, and is capable of communicating with the GM mobile station 120 and user terminal 160. In addition, the small base station may be called RRH (Remote Radio Head), pico-base station, femto-base station, Home eNodeB, transmission point, eNodeB (eNB) and the like. Further, the small base station 150 may be a Massive MIMO base station capable of communicating by the Massive MIMO transmission scheme. Furthermore, as a result of consideration of load balance, when the moving object 110 approaches, it is also possible to temporarily reduce the coverage area of the small cell with respect to the moving path so as not to communicate with the GM mobile station 120 and user terminal 160.

In this Embodiment, the macrocell and small cell are cells different from the GM cell in at least one of the frequency, communication scheme and coverage area. Accordingly, the GM cell achieves communications of low interference with the macrocell and small cell. As the communication schemes, for example, it is possible to use communication schemes called LTE, LTE-A, IMT-Advanced, 4G, and FRA. In addition, the communication schemes are not limited thereto.

Each of the GM base station 130, macro base station 140 and small base station 150 is connected to the higher station apparatus, and is connected to the core network via the higher station apparatus. In addition, for example, the higher station apparatus includes an access gateway apparatus, Radio Network Controller (RNC), Mobility Management Entity (MME) and the like. Further, the GM base station 130, macro base station 140 and small base station 150 may be subjected to wired connection or wireless connection between the base stations.

The user terminal 160 is a terminal supporting various types of communication schemes such as LTE, LTE-A and FRA, and may include a fixed communication terminal as well as the mobile communication terminal. Further, the user terminal 160 is capable of communicating with the GM mobile station 120, macro base station 140 and small base station 150 by itself.

(Basic Configuration of the GM Mobile Station)

Figure 3:
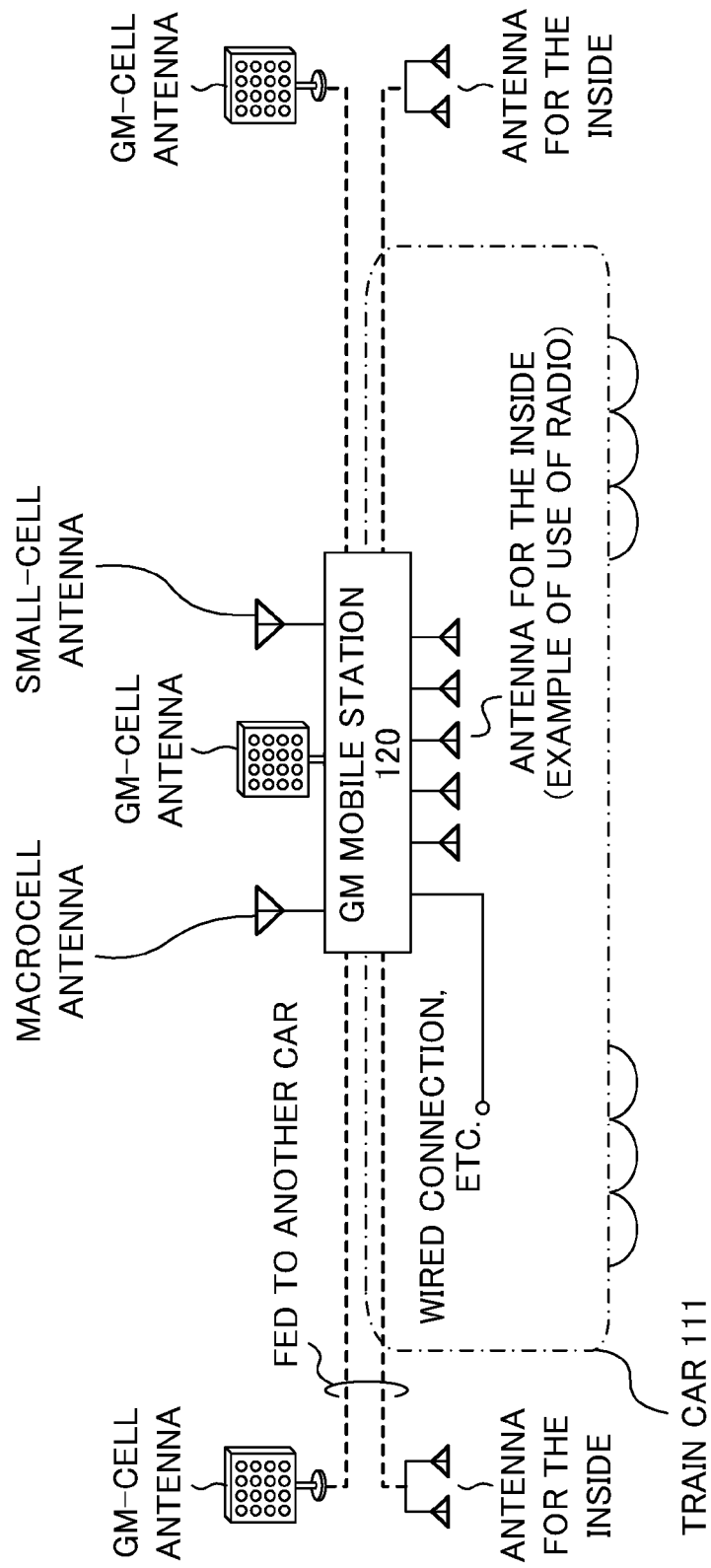
FIG. 3 is a schematic explanatory diagram of a GM mobile station according to this Embodiment.

The basic configuration of the GM mobile station according to this Embodiment will be described with reference to FIG. 3. FIG. 3 is a schematic explanatory diagram of the GM mobile station according to this Embodiment, and describes the case where the GM mobile station 120 is disposed in a single train car 111 in the moving object 110 as an example. In this Embodiment, a single GM mobile station 120 is installed in a single moving object 110. In addition, the invention is not limited thereto, and a configuration may be made where a plurality of GM mobile stations 120 is installed in a single moving object 110.

The GM mobile station 120 has a plurality of antenna elements for the GM cell to constitute MIMO. Herein, it is preferable that the number of antenna elements for the GM cell is the same as the number of antenna elements provided in the GM base station. Further, it is preferable that the antenna elements for the GM cell are equally distributed and arranged over the entire moving object. For example, when 1024 antenna elements for the GM cell are arranged in a train comprised of 16 train cars, it is possible to make a configuration where 64 antenna elements are arranged in each train car.

By such a distributed arrangement of antenna elements, it is possible to obtain a spatial multiplexing effect by distributed antenna MIMO, and to suitably perform handover between GM cells. In addition, when priority is given to cost reduction according to the arrangement and wiring of antenna elements, antenna elements may be concentrated and arranged. Particularly, by concentrating and arranging in one place, it is possible to suitably reduce the cost according to installation.

Further, the GM mobile station 120 is equipped with antennas and transmitters/receivers for the macrocell and small cell, and relays signals of the macrocell and small cell to the inside of the moving object. By this means, concurrently with ensuring stability of connection according to communications of user terminals, by the GM mobile station 120 controlling communications between each of the macrocell and small cell and a plurality of user terminals, as compared with the case where each user terminal communicates with each cell individually, it is possible reduce communication overhead of control signals, reference signals and the like required for the macrocell and small cell. Further, by adopting such a configuration, it is possible to suitably split the C/U-plane, and it is possible to appropriately change the processing capability and channel capacity.

In addition, as antennas for the macrocell and small cell, as shown in FIG. 3, only a single respective antenna may be disposed in a single moving object 110, or a plurality of antennas may be installed in a single moving object 110 to improve reception performance from the outside by a spatial diversity effect, spatial multiplexing effect or the like.

Herein, as a relay method of signals to user terminals and signals from user terminals in the GM mobile station 120, used are a DF (Decode and Forward) type relay technique and AF (Amplify and Forward) type relay technique. In addition, the relay method of signals is not limited thereto.

The DF type relay technique is also called DF relay, layer 2 relay and the like. The DF type relay technique is a technique for demodulating and decoding a received RF (Radio Frequency) signal, and then, performing coding and modulation again by a scheme suitable for a transmission destination to transmit. For example, a signal received from the GM cell is transmitted by an optimal communication scheme available in the user terminal 160. According to the DF relay, it is possible to suitably eliminate noise. Further, inside the moving object 110, since it is considered that a shift of the user terminal is a little and that the radio propagation path is relatively stable, the communication throughput improvement effect is expected by using an optimal communication method corresponding to the propagation path inside the moving object 110.

In the case of performing the DF type relay, the GM mobile station 120 acts as the generally-called base station on the inside of the moving object 110. More specifically, communications (traffic) of a plurality of user terminals inside the moving object 110 are once concentrated on the GM mobile station 120. The user terminal recognizes the GM mobile station 120 as a base station, and performs communications on the GM mobile station, as communications with a normal base station. Further, the GM mobile station behaves as a single mobile station for the GM base station, macro base station, small base station and the like outside the moving object, and performs communications (traffic) once concentrated from the inside user terminals on the GM base station and the like. By once concentrating communications of a plurality of user terminals, it is possible to reduce overhead due to control signals (C-Plane) in the user terminals, and improve communication throughput.

The moving object 110 has an antenna for the inside fed to a predetermined train car. It is preferable that the antenna for the inside is provided in each train car, but it is essential only that at least one train car is provided with the antenna. When the GM mobile station 120 relays a signal by the DF relay, the station performs radio communications with the user terminal inside the moving object via the antenna for the inside using a predetermined radio transmission technique. As the radio transmission technique, for example, it is possible to use radio LAN in conformity with IEEE 802.11 specifications. In addition, the invention is not limited thereto, and the moving object 110 may have, therein, a communication connector to connect to the GM mobile station 120 by cable so that the user terminal connects to the communication connector and thereby performs wired communications with the GM mobile station 120. Further, with illumination (LED illumination, organic EL illumination and the like) inside the moving object 110, visible-light communications and the like may be used using an electromagnetic wave with a visible light band.

The AF type relay technique is also called AF relay, layer 1 relay and the like. The AF type relay technique is a relay technique for amplifying power of a received RF signal to transmit. When the GM mobile station 120 feeds antennas for the macrocell and small cell to each train car, the AF type relay technique is suitable. The AF relay is capable of being actualized with low-cost equipment, and is suitable for communications of low delay and low power consumption. Further, since communications with the macrocell are made possible with lower power, there is also the interference reduction effect on user terminals existing in the macrocell outside the moving object.

When the GM mobile station relays a signal by the AF relay, as in the DF relay, the station performs radio communications with the user terminal using the antenna fed to a predetermined train car.

(Terminal Operation Inside the Moving Object)

Figure 4:
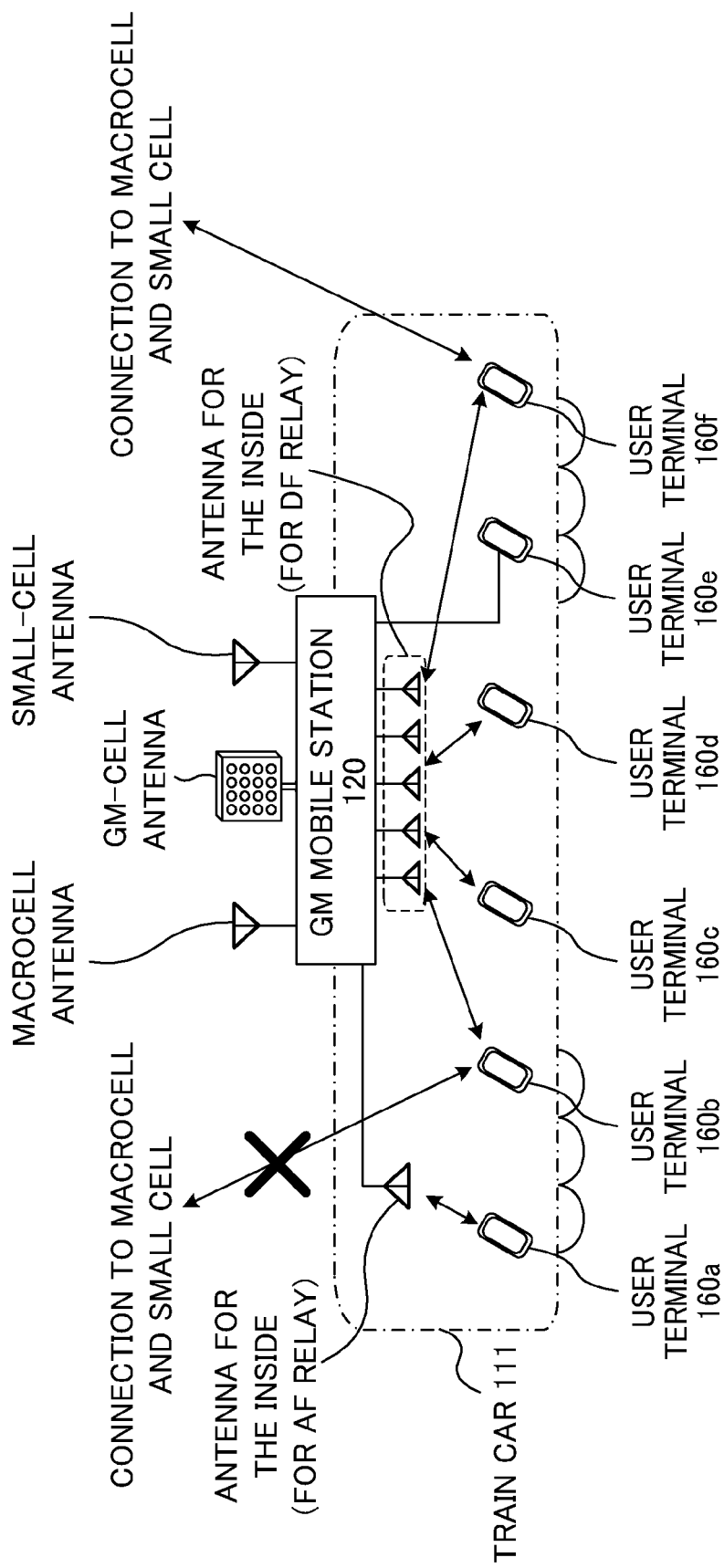
FIG. 4 is an explanatory diagram of operation of communications between a user terminal and each base station according to this Embodiment.

Operation of communications between the user terminal and each base station according to this Embodiment will be described next with reference to FIG. 4. FIG. 4 is an explanatory diagram of operation of communications between the user terminal and each base station according to this Embodiment, and describes the case where the GM mobile station 120 is disposed in a single train car 111 inside the moving object 110 as an example.

A form of connection (hereinafter, referred to as connection form) between the user terminal inside the moving object and each base station is controlled based on a connection request of the user terminal, network state and the like. As the connection form of the user terminal according to this Embodiment, various forms are conceivable according to the presence or absence of connection with the GM mobile station, conventional system and the like, and as a generally conceivable example, it is possible to select the following three forms.

A first connection form is a basic form. In the first connection form, the user terminal connects to only the GM mobile station, and does not perform direct communications with the macro base station and small base station. In FIG. 4, user terminals 160b to 160e perform communications by the first connection form. In addition, the user terminal 160b is in a state immediately after switching from a second connection form described later to the first connection form, disconnects connection to the macrocell and small cell, and is connected to only the GM mobile station 120. Further, the user terminal 106e connects to the GM mobile station 120 by cable.

The second connection form is a high-performance form. In the second connection from, in addition to connection to the GM mobile station, the user terminal connects also to the macro base station and/or small base station. In other words, in the second connection form, the user terminal executes communications (Link Aggregation) with a plurality of radio communication channels bound. Accordingly, by using the second connection form, in the user terminal, it is possible to attain improvements in communication performance in cooperation between the GM mobile station and the user terminal. In FIG. 4, a user terminal 160f executes communications by the second connection form. Further, in the second connection form, instead of directly connecting to the macro base station/small base station, the user terminal may perform communications with the GM base station using a signal relayed by the GM base station.

A third connection form is a low-performance form (low-power consumption form). In the third connection form, the user terminal connects to the macrocell by the AF relay from the GM mobile station. In addition, the DF relay is used in the first and second connection forms. In the third connection form, as compared with the case without the GM mobile station, since it is possible to increase reception intensity of a signal from the macro base station in the user terminal, it is possible to reduce power consumption according to signal reception of the user terminal. Further, since communications with the macrocell are made possible with low power, there is also the interference reduction effect on user terminals existing in the macrocell outside the moving object. In FIG. 4, a user terminal 160a executes communications by the third connection form.

The above-mentioned three connection forms are determined based on control information from the higher station apparatus, setting information of the GM mobile station or connection request of the user terminal. Further, in this Embodiment, the connection form is determined in the GM mobile station and is notified to the user terminal, but the invention is not limited thereto. For example, such a configuration may be made that the GM base station or the higher station apparatus determines a connection form and indicates the connection form to the user terminal via the GM mobile station.

Figure 5:
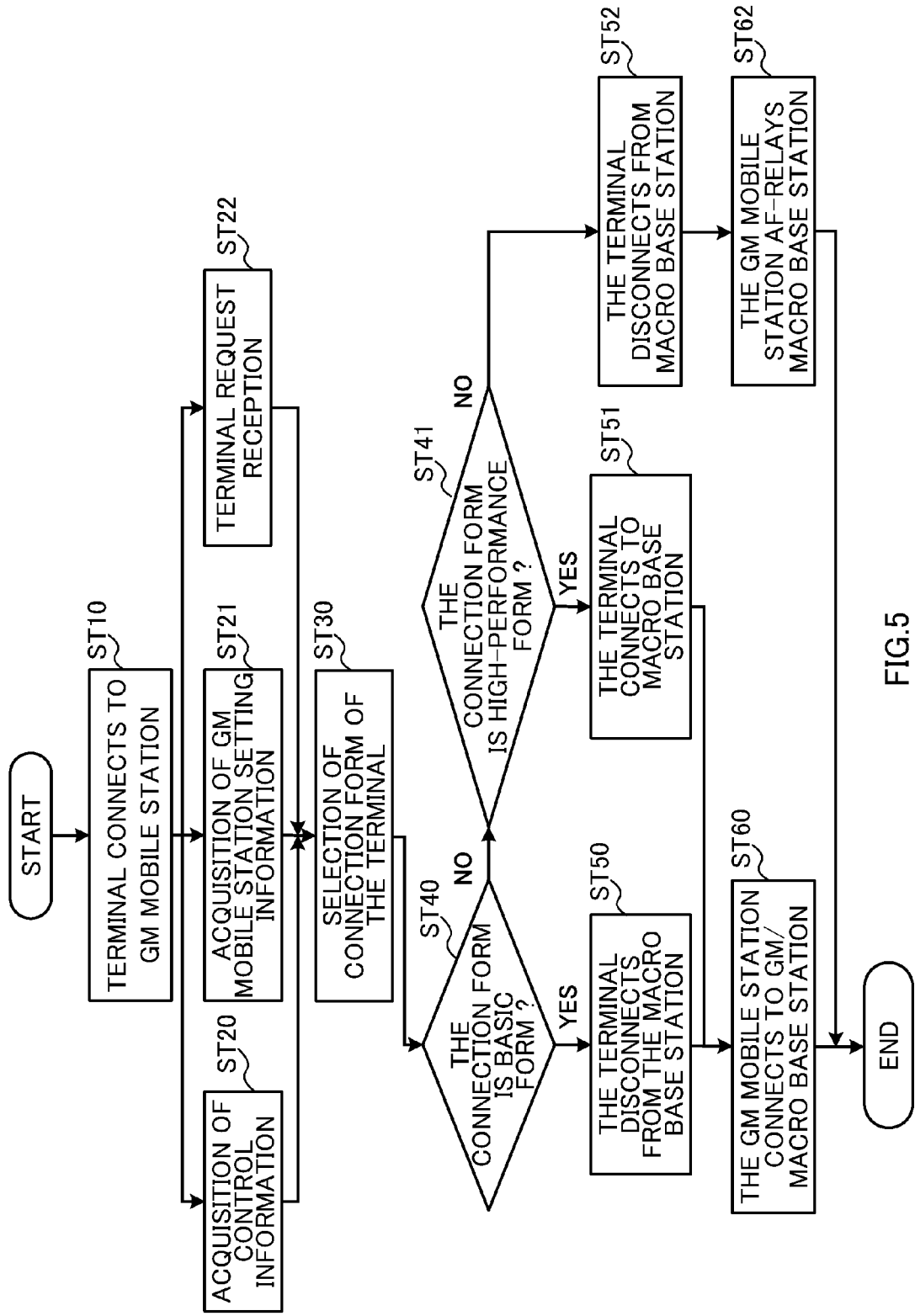
FIG. 5 is a flowchart according to connection form determination for the user terminal according to this Embodiment.

FIG. 5 illustrates a flowchart according to connection form determination for the user terminal according to this Embodiment. In addition, in the flowchart in FIG. 5, the case is assumed that the GM base station and macro base station exist as the base station with which the GM mobile station is capable of communicating, and the small base station may exist. When the small base station exists, in each processing in FIG. 5, it is possible to replace the "macro base station" with the "small base station" or "macro base station/small base station" to read.

First, the user terminal connects to the GM mobile station (step ST10). When the user terminal is capable of establishing connection to the GM mobile station, subsequent steps of the flowchart are assumed to be executed. In addition, when the user terminal is not capable of establishing connection to the GM mobile station, the user terminal is not dependent on the GM mobile station, and executes communications with the macrocell and/or small cell individually.

The GM mobile station selects the connection form of the user terminal to which connection is established from among the first to third connection forms as described above. Herein, selection of the connection form of the user terminal is executed based on at least one of three manners as described below. In addition, selection of the connection form may be performed on a particular user terminal or may be performed on a plurality of user terminals.

When the GM mobile station receives control information (step ST20), the mobile station executes selection of the connection form of the user terminal (step ST30). For example, in the case where the mobile station receives control information from the higher station apparatus via each base station, the mobile station executes selection of the connection form. In this case, the connection form of the user terminal may be selected by the higher station apparatus, may be selected by the GM base station that receives control information from the higher station apparatus, or may be selected by the GM mobile station that receives control information from one of the base stations. Further, it is essential only that the control information is information capable of being used in selection of the connection form of the user terminal, and the format is particularly not limited. For example, the control information may be information to instruct the station to change to a predetermined connection form, or may be information to instruct the station to increase or decrease communication performance of a particular user terminal.

Further, based on setting of the GM mobile station (step ST21), selection of the connection form of the user terminal is executed (step ST30). For example, when the GM mobile station observes a traffic amount of the user terminal to which connection is established, it is possible to change the connection form of a particular user terminal corresponding to an environment such that the traffic amount increases. In addition, selection of the connection form based on setting of the GM mobile station may be executed at arbitrary timing.

Furthermore, when the GM mobile station receives a connection request from a user terminal (step ST22), the station executes selection of the connection form of the user terminal (step ST30). For example, in the case of receiving a connection request from a new user terminal, in consideration of already connected user terminals, it is possible to change the connection form of each user terminal. In addition, step ST22 may be executed concurrently in parallel with step ST10.

When the connection form of the user terminal is determined, it is next determined whether or not the connection form is the basic form (step ST40). In the case where it is determined that the connection form is the basic form (step ST40—YES), when the user terminal has already established direct connection with the macro base station, the terminal disconnects the connection (step ST50).

On the other hand, when it is determined that the connection form is not the basic form (step ST40—NO), it is next determined whether or not the connection form is the high-performance form (step ST41). In the case where it is determined that the connection form is the high-performance form (step ST41—YES), when the user terminal does not establish direct connection with the macro base station, the terminal establishes the connection (step ST51).

After step ST50 or ST51, the GM mobile station establishes connection with the GM base station and/or macro base station as appropriate (step ST60). In addition, the configuration of connection is capable of being changed as appropriate so that a particular user terminal connects to the GM base station and that the other user terminals connect to the macro base station.

Further, when it is determined that the connection form is not the high-performance form (step ST41—NO), the connection form is the low-performance form (low-power consumption form). Accordingly, when the user terminal has already established direct connection with the macro base station, the terminal disconnects the connection (step ST52).

Further, the GM mobile station performs the AF-relay of a signal from the macro base station and a signal to the macro base station on the user terminal (step ST62).

In addition, the GM mobile station may have a configuration for buffering communications from the user terminal and/or each base station. In the case of downlink communication from the base station to the GM mobile station, the GM mobile station beforehand acquires a part of a large amount of data desired by the user terminal from the base station to buffer. By this means, even when the communication is disconnected by a shift of the moving object to a place that is not covered by the GM base station or the like and the like, the mobile station is capable of continuing to offer the data that is beforehand stored in the buffer to the user. Further, in the case of uplink communication, when the communication with the GM base station or the like is disconnected by a shift of the moving object to a place that is not covered by the GM base station or the like and the like, the mobile station once stores the data from the terminal in the buffer, and is capable of transmitting to a proper transmission destination when the communication is restored.

More specifically, when the moving object exists outside the coverage area of the GM cell (i.e. in a geographic position in which it is not possible to communicate with the GM cell), for the user terminal to which the station relays communications with the GM base station, the station may once buffer uplink transmission data, and when the moving object moves into the coverage area of the GM cell again, transmit the buffered data to the GM base station. Further, when the GM mobile station is not capable of relaying communications from the GM cell to the user terminal, the station may buffer downlink transmission data from the GM base station, and when the GM mobile station is capable of relaying communications to the user terminal again, transmit the buffered data to the user terminal.

As described above, according to the radio communication system according to this Embodiment, by offloading communications according to user terminals inside the moving object by the dedicated system for group mobility, it is possible to reduce the load on the existing radio communication system, and it is possible to improve system performance of the entire radio communication system.

(Radio Control of the GM Base Station and GM Mobile Station)

Figure 6:
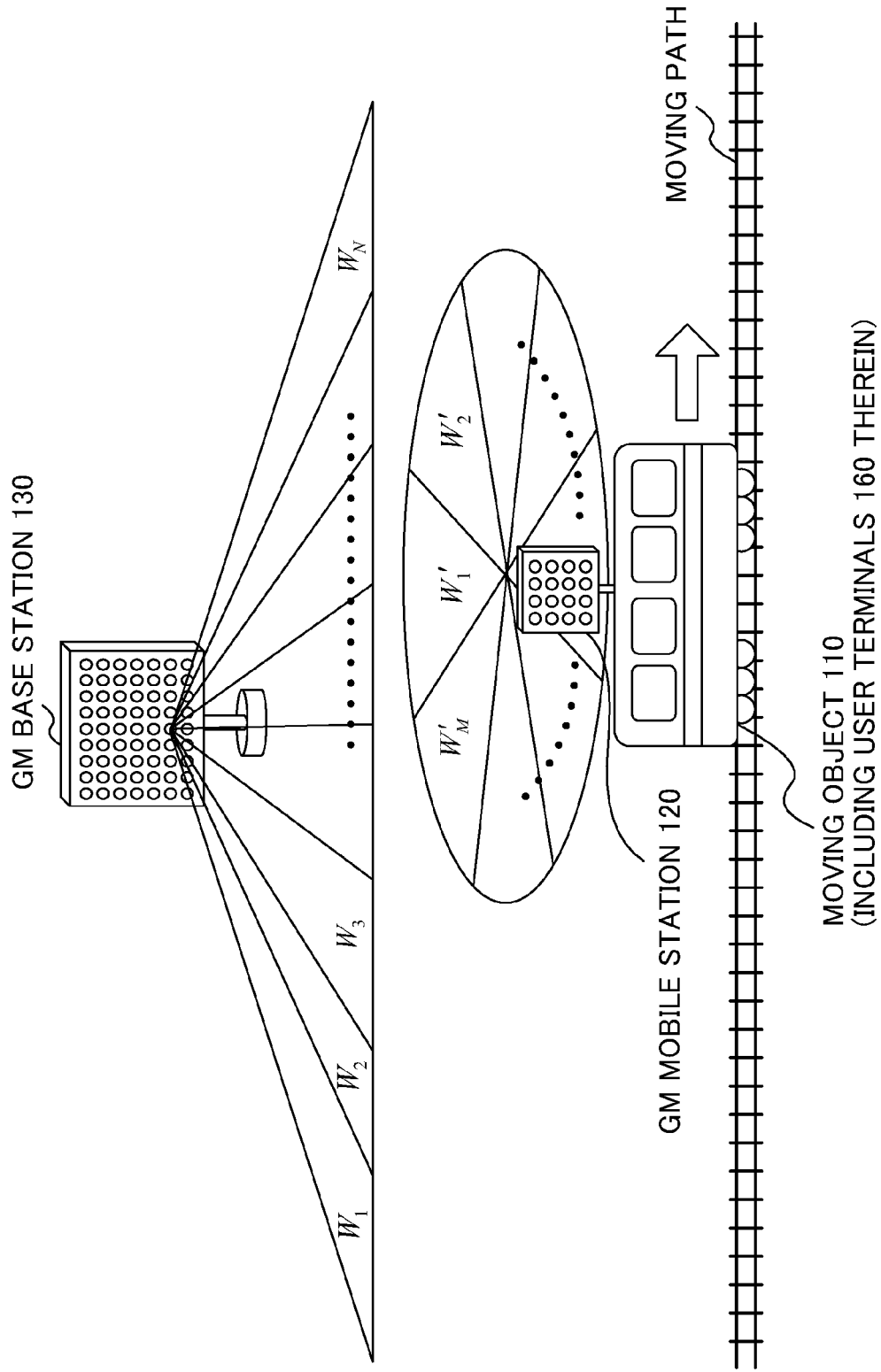
FIG. 6 is an explanatory diagram of operation according to radio control of GM base station and GM mobile station according to this Embodiment.

Operation according to radio control of the GM base station and GM mobile station according to this Embodiment will be described with reference to FIG. 6. FIG. 6 is an explanatory diagram of operation according to radio control of the GM base station and GM mobile station according to this Embodiment, and shows beams formed by the GM base station and GM mobile station and weights corresponding to the beams in the case where the moving object 110 (train) moves from left to right along a moving path (track).

The GM base station according to this Embodiment communicates with the GM mobile station, using a beam formed by beam forming (BF). Herein, it is preferable that the beam is formed by selecting a proper weight from among fixed weights (hereinafter, referred to fixed weights) for BF that are beforehand determined corresponding to a shape, width, moving direction and the like of the moving path of the mobile station covered by the GM base station. In addition, when the moving object is mounted with a plurality of antennas for GM, and the plurality of antennas is disposed apart such that the antennas exist in different train cars, by concurrently transmitting and receiving a plurality of beams to multiplex for each beam, it is possible to obtain the spatial diversity effect, spatial multiplexing effect and the like.

The weight for beam forming of the GM base station may be selected by switching the above-mentioned fixed weights at certain time intervals. For example, in the case where the moving object moves according to a rule (in the case where the train runs in accordance with a timetable and the like), since it is possible to specify a geographic position in which the moving object exists at the predetermined time, it is suitable to switch at certain time intervals.

As shown in FIG. 6, as an example, the case will be described where the moving object 110 (train) moves in the moving path from the left. At this point, the GM base station 130 grasps a position of the GM mobile station 120 mounted on the moving object 110, and forms a beam with a weight $W_1$. Subsequently, the base station executes update of the weight at predetermined time intervals, and while changing the weight as appropriate to weight $W_2$, $W_3$, . . . , $W_N$, executes communications with the GM mobile station 120. Herein, N is the number of fixed weights set on the GM base station 130.

Further, for weight formation, such a configuration may be made that formation is adaptively controlled corresponding to a traffic amount that the GM mobile station relays, a traffic configuration that the GM mobile station relays, a type of the moving object, a configuration of cars of the moving object, moving speed of the moving object, moving direction of the moving object and the like. Hereinafter, a weight for BF that is adaptively controlled is referred to as adaptive weight.

Herein, it is possible to acquire the traffic amount and traffic configuration that the GM mobile station relays by observing communication data inside the GM mobile station. As the traffic amount, an information amount of communication data may be used, or an information amount of communication data per unit time may be used. Further, for example, the traffic configuration refers to direct or indirect data concerning traffic contents such that there are large amounts of moving image data, and that there are many user terminals to connect to a particular site. Furthermore, the traffic amount and traffic configuration do not need to be information about the entire moving object, and may be information about a predetermined portion of the moving object. For example, the information may be information that a communication amount is large in the second train car. Based on the traffic amount and traffic configuration, it is possible to perform control such that a future communication amount is beforehand predicted to enhance the beam.

For example, the type of the moving object may be of rough information such as a "train" and "bus", or may be of detailed information such as a "limited express train on a predetermined route". Further, the configuration of cars of the moving object may be of information simply indicative of the number of cars, for example, such as "16 cars", or may be of information indicative of a position of a car on which the antenna for GM is mounted, and the number of antennas in the car.

Further, the type of the moving object, the configuration of cars, the moving speed, the moving direction and the like may be acquired with a sensor (camera, radar, infrared rays and the like) installed in the GM base station or the GM mobile station, or may be configured to acquire from position information of the moving object, estimation by Doppler shift, control information and the like. Furthermore, in order to enable the moving speed and moving direction to be readily acquired with the sensor, a target such as a marker may be provided in the moving object. Still furthermore, as the target, by using barcode including information on the type of the moving object, configuration of cars and the like, even in a moving object at high speed, it is possible to suitably acquire the above-mentioned information using the camera and the like. Moreover, by displaying real-time information on the moving speed, moving direction and the like of the moving object with an apparatus (for example, liquid crystal display and the like) capable of displaying the information electronically, it is also possible to acquire the information by recognition with the camera and the like.

In addition, the information used in formation of adaptive weights may be used in determining the fixed weights, where the information includes the traffic amount that the GM mobile station relays, the traffic configuration that the GM mobile station relays, the type of the moving object, the configuration of cars of the moving object, the moving speed of the moving object, the moving direction of the moving object and the like. Further, among the above-mentioned information, such a configuration may be made that the GM mobile station transmits information observed in the GM mobile station to the GM base station and/or base station in the existing system, and that these base stations and the higher station apparatus use the information. For example, the GM mobile station transmits the above-mentioned information to the macro base station, the macro base station notifies the higher station apparatus, the higher station apparatus notifies the GM base station, and the GM base station is thereby capable of suitably selecting a weight for a GM mobile station with which connection is not established.

As the adaptive weight, the type of beam (beam width, transmission power of the beam or the like) may be changed. For example, it may be configured that the beam width is widened when the moving speed of the moving object is high speed, and that the beam width is narrowed when the moving speed of the moving object is low speed.

Further, as the adaptive weight, the switching interval of weights may be changed. For example, it may be configured that the switching interval is made short when the moving speed of the moving object is high speed, and that the switching interval is made long when the moving speed of the moving object is low speed.

Furthermore, the above-mentioned fixed weight and adaptive weight may be combined to use. For example, two-stage beam forming may be used that initial connection is performed with the fixed weight when the moving object enters the edge of the coverage area of the GM base station, and that the adaptive weight is calculated and used for subsequent weights.

Still furthermore, the fixed weight and adaptive weight may be used differently corresponding to an environment. For example, different use may be performed corresponding to the presence or absence of a shielding obstruction in viewing the GM mobile station from the GM base station, the presence or absence of view of the periphery of the moving path of the moving object, the presence or absence of a scattering object of radio wave and the like.

On the other hand, the GM mobile station according to this Embodiment communicates with the GM base station using a beam formed by beam forming. Herein, the beam is subjected to beam forming toward the direction of the GM base station. It is possible to acquire the direction of the GM base station using control information and/or database. For example, the mobile station may receive information on a geographic position of the GM base station from the higher station apparatus via the macro base station. Further, the GM mobile station may hold information obtained by beforehand databasing geographic positions in which the moving object exists at the predetermined time based on the moving path of the moving object, and estimate position information of the GM base station based on the current time and/or a geographic position of the GM mobile station. In addition, for acquisition of the information on the geographic position of each base station and the GM mobile station, for example, it is possible to use GPS (Global Positioning System), scanning range sensor (also referred to as laser scanner), and the like.

As the weight for beam forming of the GM mobile station, it is preferable that the GM base station acquires information on the geographic position of the GM base station and the geographic position of the moving object (or the GM mobile station), and that beam forming is performed based on the information by selecting a proper weight from among beforehand determined fixed weights. In addition, as the fixed weight, it is essential only that it is possible to select a weight for enabling beam forming to be performed in a direction having a possibility that the GM base station exists in viewing from the moving object. For example, in the case of a configuration that the GM base station is arranged only in the right direction to the travel direction of the moving object, it is essential only that the fixed weight is set to enable a beam in the right direction to be formed.

The weight for beam forming of the GM mobile station may be selected by switching the above-mentioned fixed weights at certain time intervals. For example, in the case where the moving object moves normally according to a predetermined rule (the case where the train runs in accordance with the timetable and the like), since it is possible to specify the geographic position of the GM base station viewed from the moving object at the predetermined time, it is suitable to switch at certain time intervals. Further, in this case, since the relative position relationship between the GM base station and the GM mobile station at the predetermined time is already known without measuring with a sensor or the like, it is possible to suitably perform beam forming even when one or both of the information on the geographic positions of the GM base station and GM mobile station does not exist. In addition, also in the case of not requiring the aforementioned information on both of the geographic positions, in association with the time, even indirectly, it is clear that beam forming is performed based on the geographic positions.

As shown in FIG. 6, as an example, the case will be described where the moving object 110 (train) moves in the track from the left. At this point, the GM mobile station 120 grasps a position of the GM base station 130, and forms a beam with a weight $W_2'$. Subsequently, the station uses a weight $W_1'$ when the moving object 110 is positioned near the center of the moving path in FIG. 6, and when the unit moves further to the right, uses a weight $W_M'$. The station executes communications with the GM base station 130, while thus changing the weight as appropriate. Herein, M is the number of fixed weights set on the GM mobile station 120.

Further, for weight formation, as in the case of the GM base station, formation may be configured with adaptive weights corresponding to the traffic amount that the GM mobile station relays, the traffic configuration that the GM mobile station relays, the type of the moving object, the configuration of cars of the moving object, the moving speed of the moving object, the moving direction of the moving object and the like. Furthermore, in the GM mobile station, such a configuration may be made that the adaptive weight is used based on a result obtained by performing channel estimation on a radio signal from the GM base station.

Moreover, the fixed weight and adaptive weight may be combined to use. For example, two-stage beam forming may be used that initial connection is performed with the fixed weight, and that the adaptive weight is calculated and used for subsequent weights.

(Configurations of the GM Mobile Station and GM Base Station)

Configurations of the GM mobile station and GM base station according to this Embodiment will be described below with reference to FIGS. 7 to 9.

Figure 7:
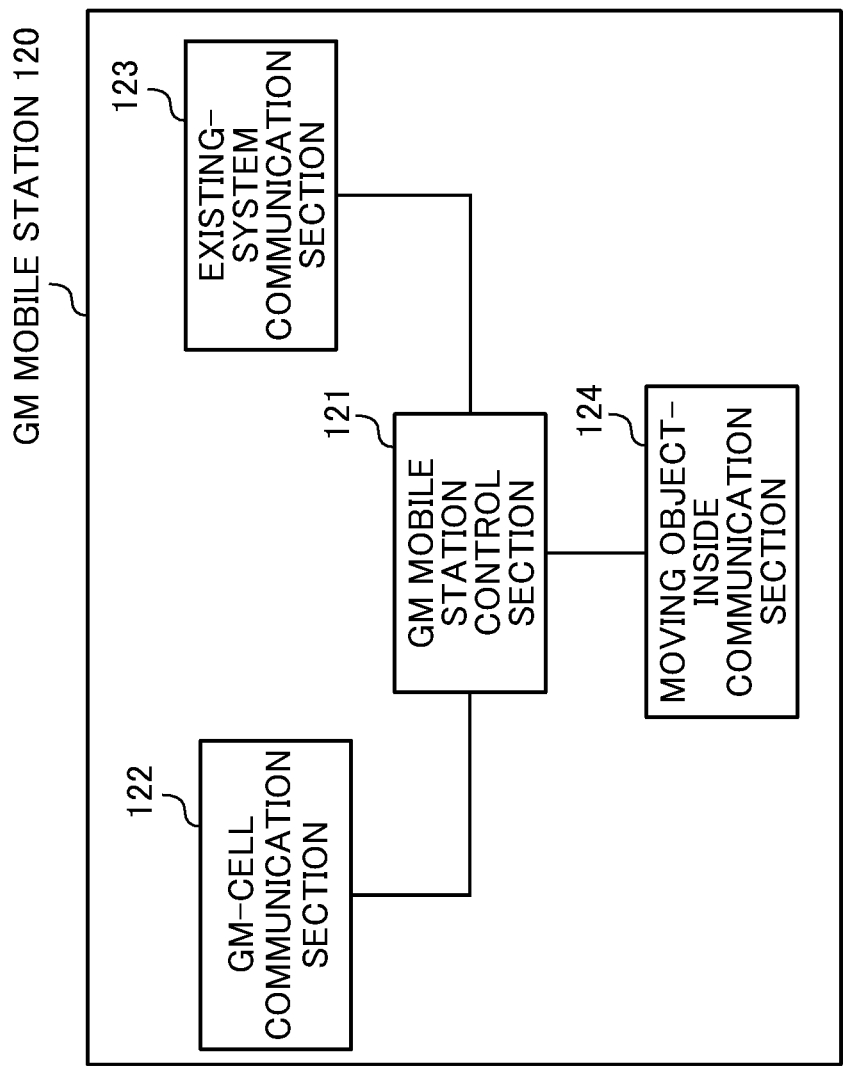
FIG. 7 is an entire configuration diagram of the GM mobile station according to this Embodiment.

FIG. 7 is an entire configuration diagram of the GM mobile station according to this Embodiment. As shown in FIG. 7, the GM mobile station 120 according to this Embodiment is provided with a GM mobile station control section 121, GM-cell communication section 122, existing-system communication section 123, and moving object-inside communication section 124.

The GM mobile station control section 121 relays communications between a user terminal and each base station, and performs control of the entire mobile station. Particularly, the section executes a determination of the connection form of the terminal. Further, the section may have the function of buffering transmission/reception data. Furthermore, the section may have the function of indicating a parameter of beam forming to the GM-cell communication section 122.

Further, the GM mobile station control section 121 is capable of determining the connection form of the user terminal. More specifically, selection of the connection form of the user terminal may be executed in the case of receiving control information from the GM-cell communication section 122 or existing-system communication section 123, may be executed based on setting of the GM mobile station, or may be executed in the case of receiving a connection request from the user terminal via the moving object-inside communication section 124.

Furthermore, it is preferable that the GM mobile station control section 121 has the function of acquiring a position of the GM base station. For example, it is possible to receive the information on the position of the GM base station from the higher station apparatus via the existing-system communication section 123. Moreover, the section may beforehand hold the information on the position of the GM base station placed on the periphery of the moving path of the moving object mounted with the GM mobile station 120. Further, it is preferable that the GM mobile station control section 121 has the function of acquiring the position of the mobile station i.e. the position of the moving object.

Figure 8:
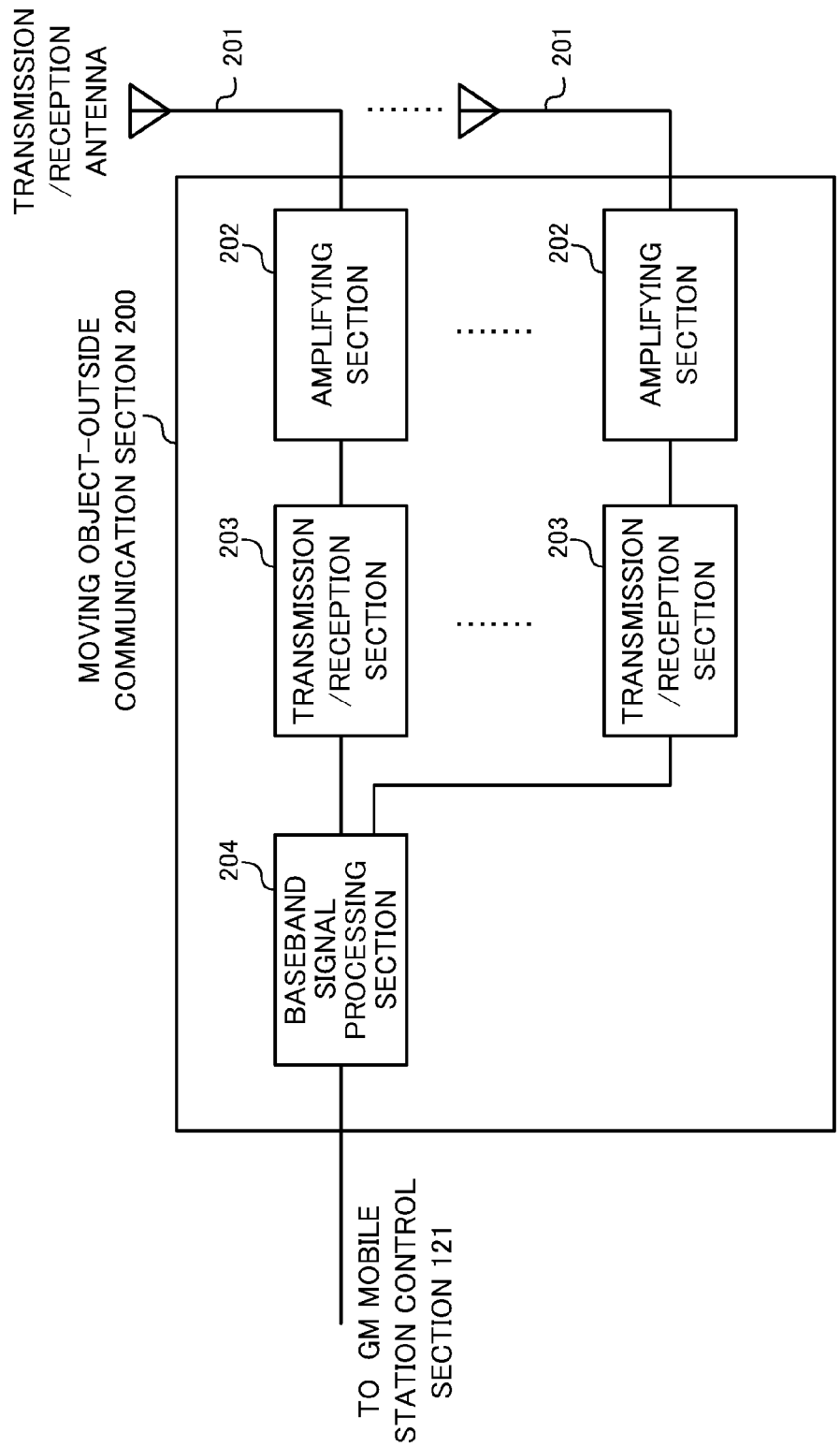
FIG. 8 is a basic configuration diagram of a GM-cell communication section or existing-system communication section according to this Embodiment.

FIG. 8 is a basic configuration diagram of the GM-cell communication section or existing-system communication section according to this Embodiment. The GM-cell communication section 122 and existing-system communication section 123 are the same in the principal configuration of hardware, and therefore, when the sections are not distinguished, are collectively called the moving object-outside communication section 200.

The moving object-outside communication section 200 is provided with transmission/reception antennas 201 (antenna port), amplifying sections 202, transmission/reception sections 203, and baseband signal processing section 204. In addition, the transmission/reception antenna 201 is comprised of a plurality of antennas for MIMO transmission, and may be comprised of a single antenna.

For downlink signals, each of radio-frequency signals received in a plurality of transmission/reception antennas 201 is amplified in the amplifying section 202, is subjected to frequency conversion in the transmission/reception section 203, and is input to the baseband signal processing section 204. The baseband signal processing section 204 performs FFT (Fast Fourier Transform) processing, error correcting decoding, reception processing of retransmission control and the like. User data included in the downlink signals is transferred to the GM mobile station control section 121. Further, among the downlink signals, broadcast information is also transferred to the GM mobile station control section 121.

On the other hand, for uplink user data, the data is input to the baseband signal processing section 204 from the GM mobile station control section 121. The baseband signal processing section 204 performs MAC (Medium Access Control) retransmission control (for example, transmission processing of HARQ (Hybrid ARQ)), channel coding, precoding, DFT (Discrete Fourier Transform) processing, IFFT (Inverse Fast Fourier Transform) processing and the like to transfer to each of the transmission/reception sections 203. Each of the transmission/reception sections 203 converts the baseband signal output from the baseband signal processing section 204 into a signal with a radio frequency band. Subsequently, each of the amplifying sections 202 amplifies the radio-frequency signal subjected to frequency conversion to transmit from respective one of the transmission/reception antennas 201.

Further, the baseband signal processing section 204 has a BF weight determining section that determines a weight for beam forming of a transmission beam in precoding. The BF weight determining section determines the weight so that the beam undergoes beam forming toward the direction of the GM base station. As the weight, beforehand defined fixed weights may be switched and selected at certain time intervals, based on the geographic position of the GM base station and/or GM mobile station, or such a configuration may be made that the adaptive weight that is adaptively controlled corresponding to an environment is calculated and used. Further, in the GM mobile station, such a configuration may be made that the adaptive weight is used based on a result obtained by performing channel estimation on a radio signal from the GM base station.

Herein, it is possible to control the adaptive weight corresponding to the traffic amount that the GM mobile station relays, the traffic configuration that the GM mobile station relays, the type of the moving object mounted with the GM mobile station, the configuration of cars of the moving object, the moving speed of the moving object, the moving direction of the moving object and the like. Further, the fixed weight and adaptive weight may be combined to use, or may be used differently according to an environment. Furthermore, beam forming may be performed, based on feedback information from the GM base station such as CSI (Channel State Information) indicative of a channel state, AOA (Angle of Arrival) used in weighting of antenna elements, AOD (Angle of Departure) and the like.

In addition, in order to acquire the information about the traffic amount that the GM mobile station relays, the traffic configuration that the GM mobile station relays, the type of the moving object, the configuration of cars of the moving object, the moving speed of the moving object, the moving direction of the moving object and the like, the station may be provided with a sensor such as a camera, radar and infrared rays. Further, such a configuration may be made that the information is transmitted to the GM base station and/or base station of the existing system via the transmission/reception antennas 201 to be used in these base stations and higher station apparatus.

Further, the transmission/reception antenna 201 is comprised of a plurality of antenna elements to form beam forming. In addition, the existing-system communication section 123 may also have the BF weight determining section, and the transmission/reception antenna 201 may be comprised of a plurality of antenna elements.

In addition, the above-mentioned moving object-outside communication section 200 is the configuration in the case of using the DF relay. In the case of using the AF relay, the moving object-outside communication section 200 is capable of performing the processing of the transmission reception antennas 201 and amplifying sections 202.

The moving object-inside communication section 124 executes communications between the GM mobile station and the user terminal inside the moving object. In this Embodiment, the moving object-inside communication section 124 communicates with the user terminal according to radio LAN in conformity with specifications related to IEEE 802.11. However, the communication scheme is not limited thereto. Further, the moving object-inside communication section 124 may have a communication section and connector for wired communications, and such a configuration may be made that the user terminal connects to the connector using a predetermined cable to execute wired communications with the moving object-inside communication section 124.

The GM base station 130 according to this Embodiment is provided with a GM base station control section and GM base station communication section (communication section) 300.

The GM base station control section performs communications with the user terminal via the GM mobile station and control of the entire GM base station. Further, the GM base station control section may have the function of indicating a parameter of beam forming to the GM base station communication section 300. Further, the GM base station control section is capable of determining the connection form of the user terminal. More specifically, selection of the connection form of the user terminal may be executed in the case of receiving control information from the higher station apparatus, may be executed in receiving setting of the GM mobile station from the GM mobile station, or may be executed in the case of receiving a connection request from the user terminal via the GM mobile station.

Further, it is preferable that the GM base station control section has the function of acquiring a position of the GM mobile station. For example, the GM base station may be provided with a sensor such as a camera, radar and infrared rays to acquire the information on the geographic position of the GM mobile station with the sensor.

Figure 9:
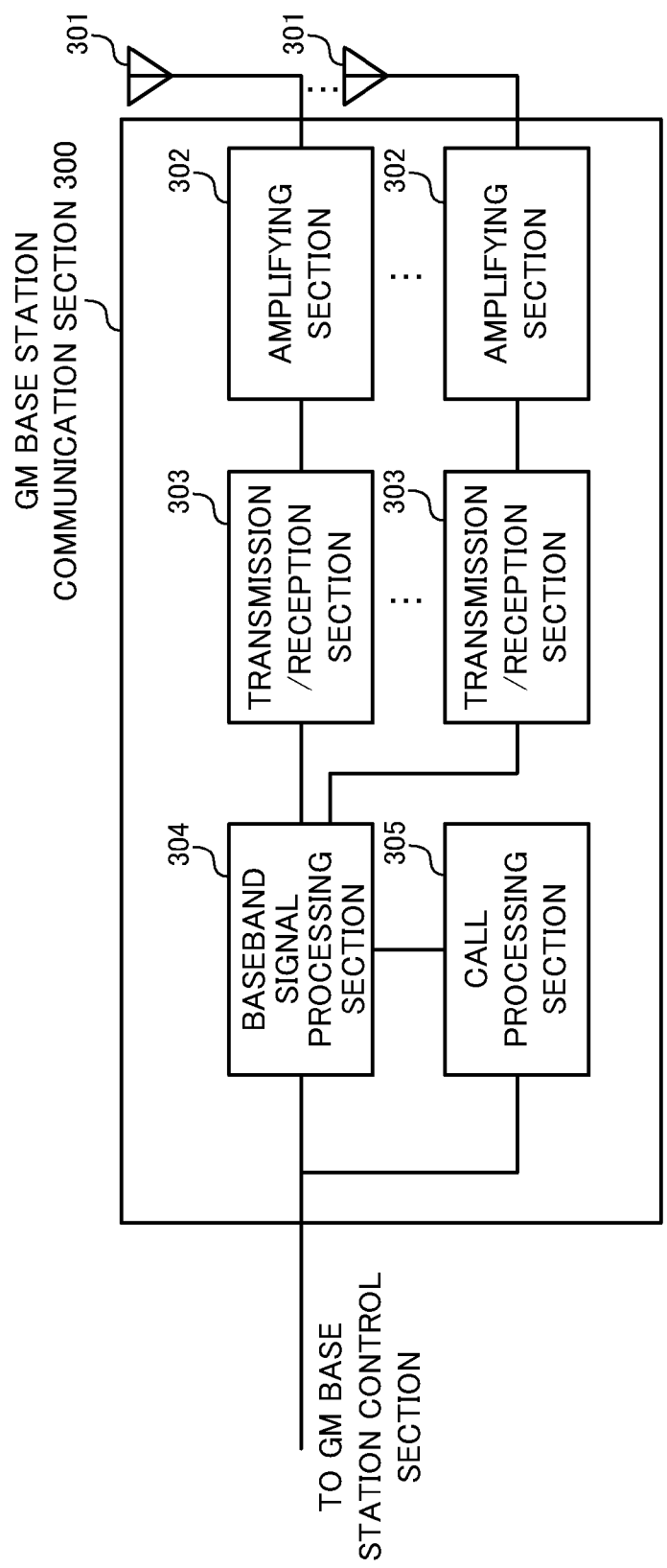
FIG. 9 is a basic configuration diagram of a GM base station communication section according to this Embodiment.

FIG. 9 is a basic configuration diagram of the GM base station communication section according to this Embodiment. The GM base station communication section 300 according to this Embodiment is provided with a plurality of transmission/reception antennas 301 for MIMO transmission, amplifying sections 302, transmission/reception sections 303, baseband signal processing section 304, and call processing section 305. In addition, the plurality of transmission/reception antennas 301 may be comprised of antenna elements for Massive MIMO.

User data to transmit to the user terminal 160 from the GM base station 130 via the GM mobile station 120 by downlink is input to the GM base station control section from the higher station apparatus via a transmission path interface, and then, is input to the baseband signal processing section 304.

The baseband signal processing section 304 performs processing of PDCP layer, segmentation and concatenation of the user data, transmission processing of RLC (Radio Link Control) layer such as transmission processing of RLC retransmission control, MAC retransmission control, scheduling, transmission format selection, channel coding, IFFT processing, and precoding processing to transfer to each of the transmission/reception sections 303. Further, also concerning a downlink control signal, the section 304 performs transmission processing such as channel coding and Inverse Fast Fourier Transform on the signal to transfer to each of the transmission/reception sections 303.

Each of the transmission/reception sections 303 converts the downlink signal, which is subjected to precoding for each antenna and is output from the baseband signal processing 304, into a signal with a radio frequency band. Each of the amplifying sections 302 amplifies the radio-frequency signal subjected to frequency conversion to transmit from respective one of the transmission/reception antennas 301.

On the other hand, for an uplink signal, a radio-frequency signal received in each of the transmission/reception antennas 301 is amplified in respective one of the amplifying sections 302, is subjected to frequency conversion in respective one of the transmission/reception sections 303 and is thereby converted into a baseband signal, and the signal is input to the baseband signal processing section 304.

For user data included in the input uplink signal, the baseband signal processing section 304 performs FFT processing, IDFT processing, error correcting decoding, reception processing of MAC retransmission control and reception processing of RLC layer and PDCP layer, and the signal is output to the GM base station control section, and then, is transferred to the higher station apparatus via a transmission path interface. The call processing section 305 performs call processing such as setting and release of a communication channel, state management of the base station, and management of radio resources.

Further, the baseband signal processing section 304 also has a BF weight determining section to determine a weight for beam forming of a transmission beam in precoding. The BF weight determining section determines the weight so that the beam undergoes beam forming toward the direction of the GM mobile station. As the weight, beforehand defined fixed weights may be switched and selected at certain time intervals, based on the moving path of the GM mobile station (i.e. moving object), or such a configuration may be made that the adaptive weight that is adaptively controlled corresponding to an environment is calculated and used. Further, in order to form beam forming, the transmission/reception antennas 301 are comprised of a plurality of antenna elements.

Moreover, for weight formation, as in the case of the GM mobile station, formation may be configured with the adaptive weight corresponding to the traffic amount that the GM mobile station relays, the traffic configuration that the GM mobile station relays, the type of the moving object, the configuration of cars of the moving object, the moving speed of the moving object, the moving direction of the moving object and the like. Further, the fixed weight and adaptive weight may be combined to use. Furthermore, beam forming may be performed, based on feedback information such as CSI from the GM mobile station, AOA, AOD and the like.

As described above, according to the radio communication system according to this Embodiment, by offloading communications according to user terminals inside the moving object by the dedicated system for group mobility, it is possible to reduce the load on the existing radio communication system. According to this configuration, without adding any modification to the user terminal, it is possible to improve system performance of the entire radio communication system.

As described above, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2013-212303 filed on Oct. 9, 2013, entire content of which is expressly incorporated by reference herein.

The invention claimed is:

1. A radio communication system for mobile communications in a plurality of user terminals existing inside a moving object, comprising:
   a radio base station that forms a cell on a moving path of the moving object; and
   a radio mobile station installed in the moving object to relay communications between the plurality of user terminals and the radio base station,
   wherein at least one of the radio base station and the radio mobile station performs communications using a beam formed by beam forming according to one of the following:
   (1) the radio mobile station forms the beam using a weight selected from a plurality of weights that are candidates for selection, based on a geographic position of at least one of the radio base station and the radio mobile station;
   (2) the radio base station forms the beam using a weight selected from a plurality of weights that are candidates for selection, based on the moving path of the moving object; and
   (3) at least one of the radio base station and the radio mobile station forms the beam using a weight adaptively controlled based on at least one of a traffic amount that the radio mobile station relays, a traffic configuration that the radio mobile station relays, a type of the moving object, a configuration of cars of the moving object, moving speed of the moving object, and a moving direction of the moving object.

2. The radio communication system according to claim 1, further comprising:
   a second radio base station that forms a cell different in at least one of a frequency, a communication scheme and a coverage area from the cell formed by the radio base station on the moving path of the moving object,
   wherein the radio mobile station relays communications between the plurality of user terminals and each of the radio base station and the second radio base station.

3. The radio communication system according to claim 1, wherein at least one of the radio base station and the radio mobile station performs communications using a beam formed by beam forming.

4. A radio mobile station for relaying communications between a plurality of user terminals existing inside a moving object and a radio base station, comprising:
   a moving object-inside communication section that performs communications with the plurality of user terminals;
   a control section that controls communications between the plurality of user terminals and a radio base station for forming a cell on a moving path of the moving object; and
   a moving object-outside communication section that performs communications with the radio base station,
   wherein the radio mobile station is installed in the moving object and
   wherein the moving object-outside communication section forms a beam using a weight selected from a plurality of weights that are candidates for selection, based on a geographic position of at least one of the radio base station and the moving object, to perform communications with the radio base station.

5. A radio base station in a radio communication system for mobile communications in a plurality of user terminals existing in a moving object,
   wherein the station forms a cell on a moving path of the moving object, and has a communication section that performs communications with the plurality of user terminals via a radio mobile station installed inside the moving object,
   wherein the radio base station forms a beam using a weight selected from a plurality of weights that are candidates for selection, based on the moving path of the moving object, to perform communications with the radio mobile station.

* * * * *